United States Patent [19]

Schmitter et al.

[11] 3,842,924

[45] Oct. 22, 1974

[54] DAMPING ARRANGEMENT FOR A BALANCE

[75] Inventors: Albert Schmitter, Gruningen; Ernst Strickler, Wolfhausen, both of Switzerland

[73] Assignee: Mettler Instrumente AG, Greifensee-Zurich, Switzerland

[22] Filed: Jan. 2, 1973

[21] Appl. No.: 320,204

[30] Foreign Application Priority Data

Feb. 25, 1972 Switzerland.................... 2715/72

[52] U.S. Cl. ............................................ 177/184
[51] Int. Cl. ............................................ G01g 21/17
[58] Field of Search .......................... 177/184–189

[56] References Cited
UNITED STATES PATENTS

| | | | |
|---|---|---|---|
| 2,619,200 | 11/1952 | Pezoic............................ | 177/184 |
| 2,901,239 | 8/1959 | Sethna........................... | 177/184 |
| 3,053,332 | 9/1962 | Buchtenkirch et al. ........ | 177/184 X |
| 3,080,936 | 3/1963 | Sher et al...................... | 177/184 X |
| 3,176,508 | 4/1965 | Ward.............................. | 177/184 X |
| 3,354,710 | 11/1967 | Johnson......................... | 177/184 X |
| 3,648,790 | 3/1972 | Bishop........................... | 177/184 X |

FOREIGN PATENTS OR APPLICATIONS 1,030,870   5/1966   Great Britain.................. 177/184

*Primary Examiner*—Richard B. Wilkinson
*Assistant Examiner*—Vit W. Miska
*Attorney, Agent, or Firm*—Hans Berman; Kurt Kelman

[57] ABSTRACT

A dashpot arrangement for damping the oscillations of the weighing pan on a balance has two cylinders, co-axial and open toward each other, which are mounted on the supporting structure of the balance, pistons attached to the pan and to each other and respectively movable in the cylinders in a predominantly axial direction, and piston rings radially freely movable on the pistons which maintain annular throttling gaps with the inner cylinder faces even though the piston movement has a minor component transverse to the common cylinder axis.

10 Claims, 3 Drawing Figures

DAMPING ARRANGEMENT FOR A BALANCE

This invention relates to damping arrangements for balances, such as precision balances, and particularly to a dashpot arrangement for such balances.

It is common practice to provide balances with damping devices for absorbing the energy of oscillations of the movable balance elements, and a dashpot has been used for this purpose. The known dashpot consists of a metal cylinder mounted on the normally stationary balance portion and a circular disc or piston axially movable in the cylinder with a small radial clearance, the piston being connected with the weighing pan for simultaneous movement, as by being suspended from the balance beam. The energy of oscillation is converted to thermal energy of the fluid passing through the clearance gap between the piston and the cylinder. Air is the fluid usually filling the cylinder, and the gap must be very narrow to make the device effective at the low viscosity of air.

In all balances, the movement of the piston has a predominant axial component, but a minor radial component is unavoidable if the piston is attached to a balance beam or equivalent balance element. To avoid frictional contact between the piston and the inner cylinder face, the gap must be made wider than would be desirable for greatest damping effect.

The primary object of this invention is the provision of a dashpot arrangement in which a minimal clearance gap between piston and cylinder can be maintained regardless of a minor radial component in the piston movement.

Another object is the provision of a dashpot arrangement which is not significantly more complex than dashpots employed heretofore and having the inherent shortcoming described above.

With these and other objects in view, the invention provides a dashpot arrangement with a piston member and cylinder member having an inner, axially extending annular face which are connected by suitable mountings for relative movement having a predominant component in the direction of the cylinder axis. The piston member of the invention is spaced relatively widely from the inner cylinder face and carries a piston ring mounted for free movement transverse to the axis. The outer circumference of the ring and the inner cylinder face are dimensioned to define therebetween an annular throttling gap narrower than the spacing of the piston member from the cylinder face, and this gap is maintained by the air flowing therethrough and displacing the piston ring.

Other features and the attendant advantages of the invention will readily be appreciated from the following detailed description of a preferred embodiment when considered in connection with the appended drawing in which.

Figure 1:
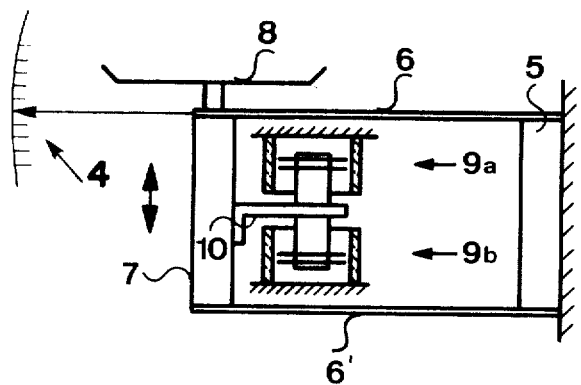
FIG. 1 shows a balance equipped with a dashpot arrangement of the invention in side elevation, and partly in section.

The balance illustrated in FIG. 1 only to the extent required for an understanding of the invention has an upright bar 5 fixedly mounted on the stationary support structure of the balance, not shown in detail. Two straps 6, 6' of spring steel are horizontally attached to respective ends of the bar 5, and their free ends are connected by a bar 7 equal in length to the stationary bar 5. A weighing pan 8 is carried by the upper end of the resiliently movable bar 7. When an object to be weighed is placed on the pan 8, the bar 7 is moved in a generally downward direction, and the weight of the object may be read from cooperating indicia 4 on the bar 7 and the stationary balance structure in a conventional manner.

Figure 2:
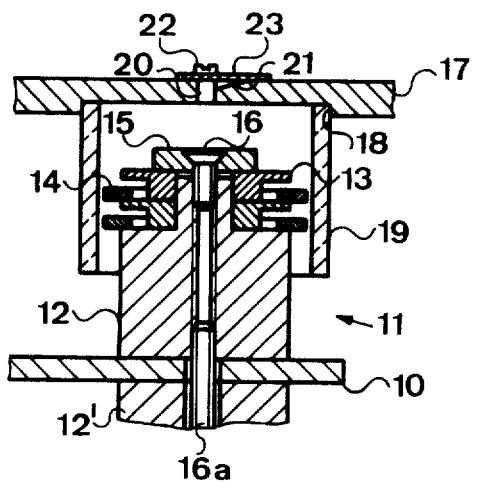
FIG. 2 illustrates a portion of the apparatus of FIG. 1 in enlarged side-elevational section.
Figure 3:
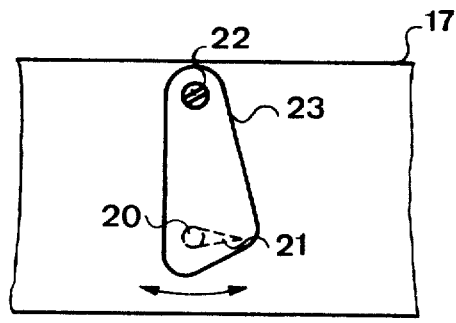
FIG. 3 is a fragmentary plan view of the device of FIG. 2.

However, the resiliency of the straps 6, 6' causes the bar 7 to oscillate, as indicated by a double arrow, unless the load is applied to the pan 8 with extreme care, and a weight reading cannot be taken until the energy of oscillation has been dissipated. The internal friction in the straps and the frictional resistance of the ambient air are insufficient under most conditions to permit rapid weighing, and the invention provides two dashpots 9a, 9b whose piston assemblies are mounted on a common bracket 10 fastened to the bar 7 while the cylinders are mounted coaxially on the stationary support structure of the balance in such a manner that the open ends of the cylinders face each other. The two dashpots are identical, and only the dashpot 9a will be described in detail with reference to FIGS. 2 and 3.

The piston assembly 11 of the dashpot 9a includes a plunger 12 of stepped cylindrical shape. The wider plunger portion rests on the bracket 10, and the narrower plunger portion remote from the bracket 10 coaxially carries two annular, radially flanged spacers 13. The flanges of the two spacers and the annular top face of the wider plunger portion bound two annular grooves open in a radially outward direction and respectively receiving piston rings 14.

The piston rings are identical, flat, annular discs, preferably of light metal, that is, aluminum, magnesium, or alloys thereof whose inner diameters are substantially smaller than the outer diameter of the narrower portion of the plunger 12 so as to permit free movement of the rings 14 in respective planes perpendicular to the axis of the plunger 12. The spacers 13 are fixedly fastened to the plunger 12 by a washer 15 and a barrel nut 16 engaging one of the two threaded ends of a rod 16a received in aligned bores of the plunger 12, of the plunger 12' of the dashpot 9b, and of the bracket 10. The rod 16a thus fixedly fastens the piston assemblies of both dashpots to each other and to the weighing pan 8.

A flat, horizontal bar 17, which is an element of the stationary support structure of the balance, not otherwise shown in detail, has a shallow, circular recess 18 in its lower face, and a cylindrical glass tube 19 is cemented to the bar 17 in the recess so that the tube provides the annular, axial wall of a cylinder whose inner chamber is bounded in an upward axial direction by a transverse end wall provided by the bar 17. The chamber is bounded in an axially downward direction by the piston assembly 11 and the piston rings 14.

The clearance between the inner circumference of each ring 14 and the reduced portion of the plunger 12 is greater than the gap between the outer circumference of the ring and the inner face of the glass tube 19 so that the ring is free to move into direct contact of any point of its circumference with the glass tube 19. The radial spacing of the plunger 12 from the coaxial tube 19 is much greater so that the effective flow section for air between the afore-described cylinder chamber and the ambient air is determined by the gap between each piston ring and the tube 19.

An axial bore 20 in the bar 17 communicating with the recess 18 and the cylinder chamber has an enlarged outer orifice constituted by a groove 21 in the upper or outer face of the bar 17. The groove tapers in cross section away from the bore 20. A screw 22 provides a pivot for a control flap 23 which, in the illustrated position, completely closes the groove 21, but may be moved angularly on the screw 22, as shown by a double arrow in FIG. 3.

When an object to be weighed is placed on the pan 8, the pan 8, together with the bar 7, bracket 10, and the piston assemblies of both dashpots 9a,9b, moves downward in a path which is arcuate, but whose radius of curvature is so much greater than its length that the movement of the plungers 12, 12' has a predominant axial component, and only a minor, though not negligible radial component. The plunger 12 moves outward of the associated cylinder chamber, whereby air is drawn into the chamber through the narrow gaps between the piston rings 14 and the inner axial face of the tube 19. Correspondingly, air is expelled from the dashpot 9b, and some of the kinetic energy of the moving pan 8 and of the balance elements fastened thereto is absorbed by the flow resistance of the dashpots to the respective air streams. Another portion of that energy is stored in the straps 6, 6', and the pan 8 rebounds upward when the stored energy reaches a certain value. During the upward movement, air is discharged from the dashpot 9a and drawn into the dashpot 9b, absorbing additional energy, so that the oscillations of the pan are quickly damped to a standstill, and a weight reading can be taken.

The axial clearance between the piston rings 14 and the radial walls of the grooves in which the rings are partly received need be only about 0.1 mm to permit the rings to be centered on the plungers 12, 12' by the streams of air moving axially through the gaps along the ring perimeters, and thus to keep the width of the gaps uniform with great precision although the radial component of plunger movement may be greater than the gap width. It has been found that annular gaps 0.01 mm wide can readily be maintained with thin, light-weight piston rings of the type illustrated, though not drawn to scale. Because of the low coefficient of friction between glass and metal generally, accidental contact between the piston rings and the inner cylinder face does not cause the piston assembly to stick to the cylinder wall. A plastic tube, such as a nylon tube, may replace the glass tube 9 to equal advantage.

While the invention has been described with reference to a spring balance of relatively simple design, it is not limited in its application to any specific type of balance, and is most useful in analytical balances of many types, including balances in which the weighing pan is carried by a rigid beam. Magnetic dampers were commonly employed heretofore on such balances because known dampers of the dashpot type either reduced the precision of the balance when a narrow air gap caused friction between the piston and cylinder of the dashpot, or an otherwise adequate gap did not produce rapid decay of beam oscillations. It has been found that a magnetic damper of good commercial quality permitted a weight reading on an analytical balance to be taken 0.95 second after release of the balance beam, whereas the beam of the same balance was stopped by a dashpot arrangement of the illustrated type within only 0.4 second under otherwise identical conditions.

The use of two dashpots coupled in the manner illustrated has been found to eliminate the effects of the different rates of air flow into and out of a dashpot which can affect weighings on analytical balances of highest precision only. In less demanding applications, a single dashpot of the invention has been found fully satisfactory.

The radially movable piston rings of the invention permit the piston assemblies to be attached fixedly to the weighing pan, as illustrated, or to any other element of the balance which is connected to the weighing pan for simultaneous movement, even though the pan or other element may not move in a precisely axial path. Such a fixed connection is generally preferred because it prevents swinging movement of the piston assembly transversely to the cylinder axis in a manner not readily foreseeable nor controllable without relatively complex modification of the dashpot arrangement.

The gap between the piston rings 14 and inner cylinder faces are preferably dimensioned to provide the desired damping when the pan 8 is loaded to the full rated capacity of the balance. When much lighter objects are to be weighed, weaker damping may be preferable, and the dashpot arrangement may be set precisely for the desired effect by loosening the screw 22 and shifting the flap 23 until the desired effective flow section of the bore 20 is set, whereupon the setting may be secured by tightening the screw 22.

As is inherent in the structure, the dashpot arrangement of the invention does not require a piston assembly to be centered precisely in the associated cylinder, and the relative position of the two principal dashpot components does not require adjustment during extended use. The piston rings 14 also permit a free choice of cylinder materials to reduce cost and provide desired frictional properties. It was impractical heretofore to make cylinders for balance dashpots from materials other than metal which could be bored, ground, and honed to a precisely cylindrical internal shape of uniform cross section. The piston rings 14 automatically adjust for minor variations in shape and cross sectional area of the associated cylinders, thereby permitting the use of glass tubing or plastic cylinder material.

The illustrated piston assemblies carry two pistons rings each. However, the number of piston rings in each cylinder is not critical. A single ring may serve adequately under many conditions. The use of more than two rings is not comtemplated at this time, but possible if so desired.

Other modifications and variations of the aforedescribed apparatus are obviously possible in the light of the instant teachings. It should be understood, therefore, that, within the scope of the appended claims, this invention may be practiced otherwise than as specifically described.

What is claimed is:

1. A balance arrangement comprising, in combination:

a. a balance having a normally stationary support, a weighing pan movable relative to said support under an applied load, and indicating means for indicating the magnitude of the applied load;

b. a cylinder member having an axis and an inner, axially extending annular face;
c. a piston member received in said cylinder member for relative movement of said members having a predominant component in the direction of said axis while said piston member is spaced from said face transversely of said direction;
d. fastening means fastening one of said members to said support;
e. motion transmitting means connecting the other member to said weighing pan for simultaneous movement; and
f. a piston ring mounted on said piston member for free movement relative to said piston member transverse to said axis,
1. the outer circumference of said ring and said face being dimensioned to define therebetween an annular gap narrower than the spacing of said piston member from said face.

2. An arrangement as set forth in claim 1, wherein said fastening means said cylinder member to said support.

3. An arrangement as set forth in claim 1, wherein said movement has a minor component transverse to said axis.

4. An arrangement as set forth in claim 3, wherein said ring essentially consists of light metal and said inner face essentially consists of plastic or glass.

5. An arrangement as set forth in claim 3, wherein said cylinder member has an end wall transverse to said axis, said end wall, said face, said piston member, and said ring jointly bounding a chamber in said cylinder member, a body of air filling said chamber and communicating with ambient air through said gap.

6. An arrangement as set forth in claim 5, wherein said end wall is formed with a passage therethrough connecting said chamber with said ambient air, the arrangement further comprising control means for varying the effective flow section of said passage.

7. An arrangement as set forth in claim 6, wherein said passage flares outward of said chamber toward an enlarged orifice, and said control means include a control element fastened to said end wall for movement between a plurality of respective positions in which said control element obstructs varying portions of said orifice.

8. An arrangement as set forth in claim 7, wherein said passage has an inner portion extending axially away from said chamber, and an outer portion elongated transversely to said axis and forming a groove in an outer face of said end wall, the depth of said groove decreasing gradually in a direction away from said inner portion, said groove constituting said orifice.

9. An arrangement as set forth in claim 2, further comprising another cylinder member fastened to said support and substantially coaxial with said first-mentioned cylinder member, another piston member fixedly fastened to said first-mentioned piston member for movement with the latter, and another piston ring mounted on said other piston member for free movement transverse to said axis, said other piston ring and said other cylinder member defining a restricted gap therebetween, said cylinder members being axially open toward each other.

10. An arrangement as set forth in claim 2, wherein said motion transmitting means fixedly fasten said piston member to said weighing pan for joint movement.

* * * * *